Dec. 4, 1934.   F. JUDGE   1,982,738
METHOD OF MAKING A TAP
Original Filed Nov. 30, 1931   2 Sheets-Sheet 1
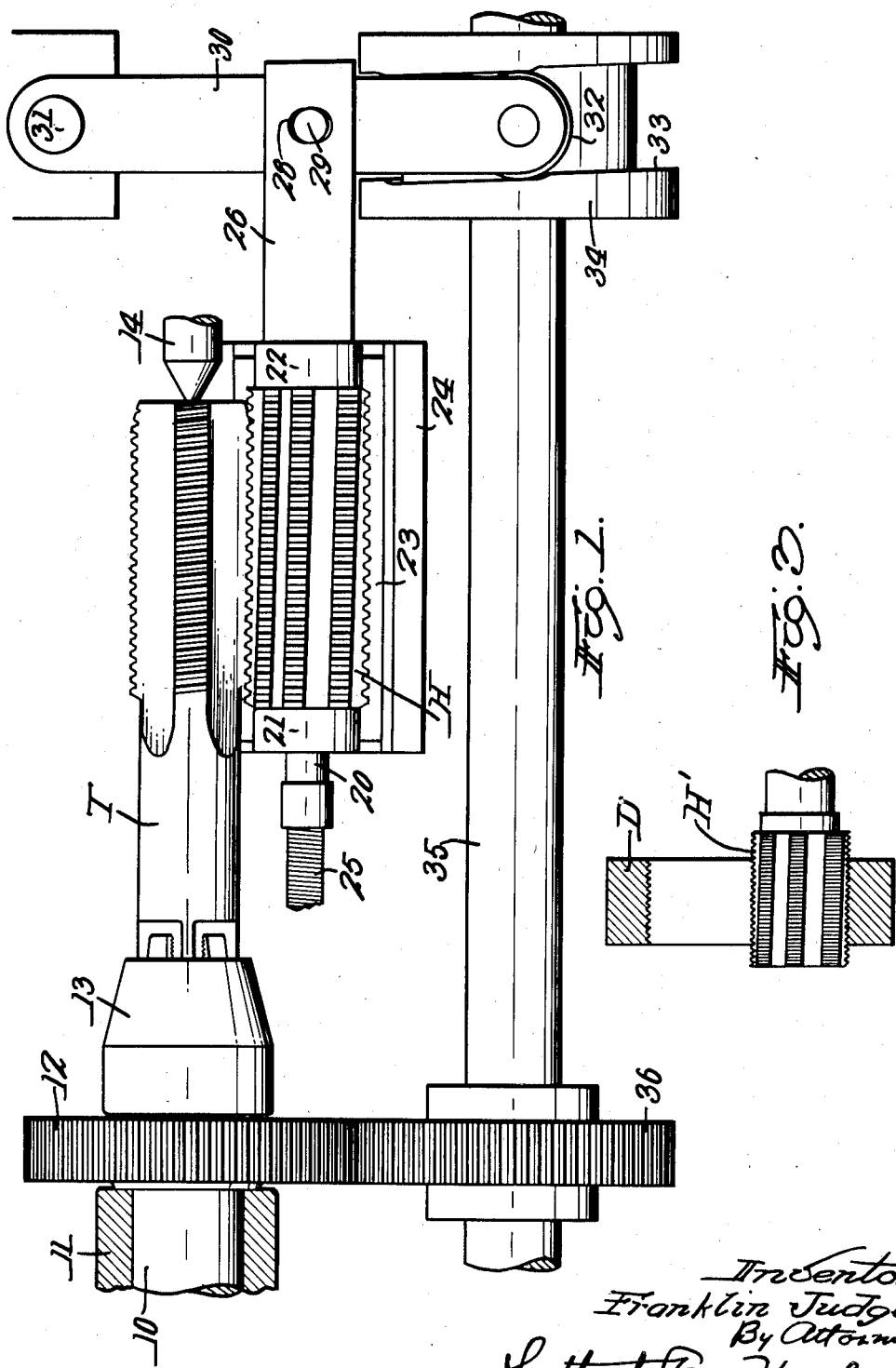
Inventor
Franklin Judge
By Attorneys
Southgate Hoyt + Hawley

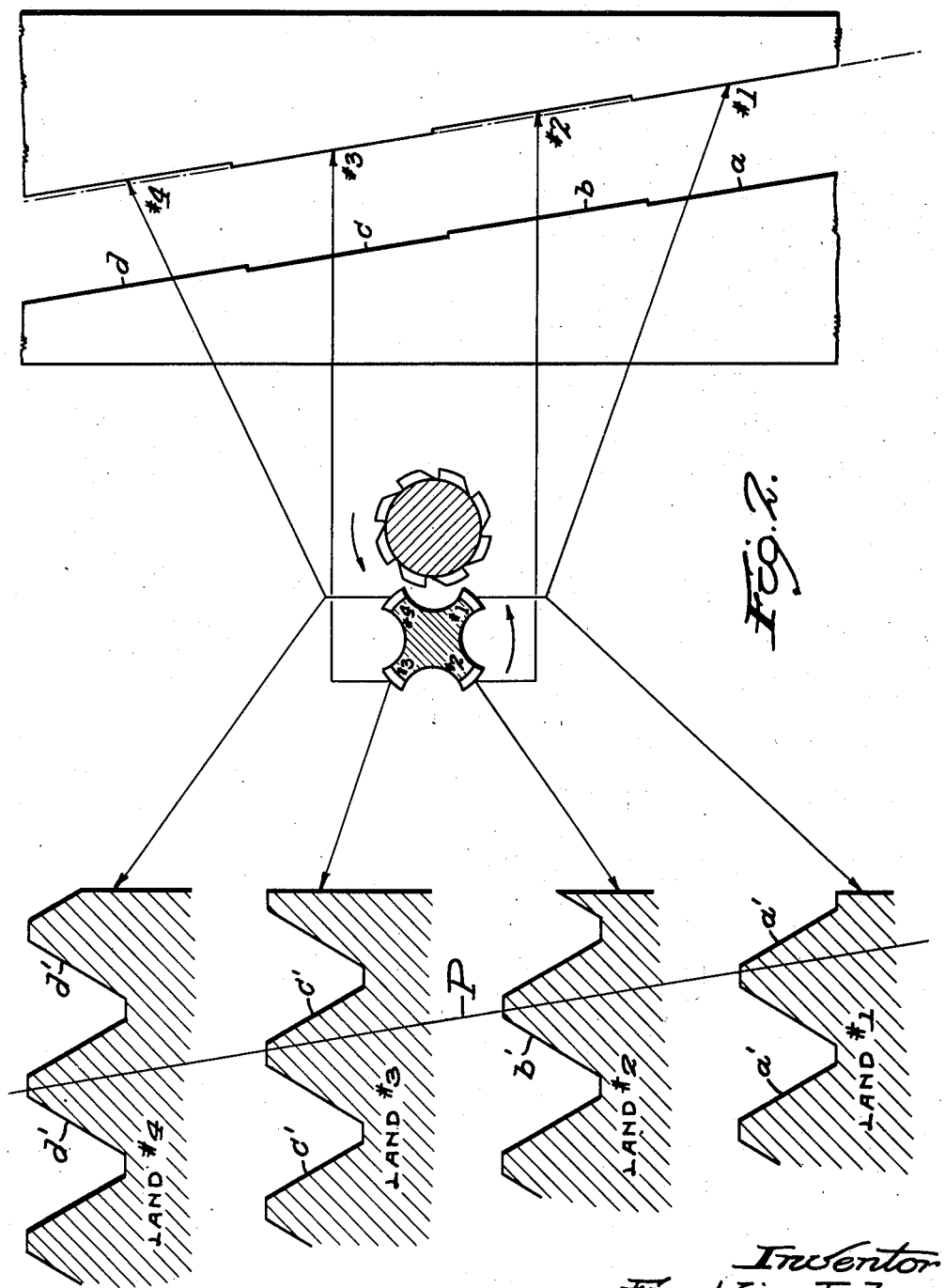

Patented Dec. 4, 1934

1,982,738

UNITED STATES PATENT OFFICE 1,982,738

METHOD OF MAKING A TAP

Franklin Judge, Greenfield, Mass., assignor to Greenfield Tap & Die Corporation, Greenfield, Mass., a corporation of Massachusetts Original application November 30, 1931, Serial No. 578,038. Divided and this application November 20, 1933, Serial No. 698,868

4 Claims. (Cl. 76—101)

This application is a division of my prior application filed November 30, 1931, Serial No. 578,038.

This invention relates to taps having successive cutting teeth offset axially on opposite sides of a reference helix line.

In the preferred form, all of the teeth on one land of the tap are offset on one side of the helix line and all of the teeth on the next successive land of the tap are offset on the opposite side.

A tap having these defined characteristics is shown and described in my prior application Serial No. 555,951, filed August 8, 1931.

My present invention relates to an improved method of manufacturing such taps.

My invention further relates to certain ordered procedure which will be hereinafter described and more particularly pointed out in the appended claims.

A preferred form of apparatus adapted for carrying out my improved method is shown in the drawings, in which Fig. 1 is a plan view of portions of a tap hobbing machine designed to produce my improved taps;

Fig. 2 is a diagrammatic view illustrating the detail steps of the method, and

Fig. 3 is a detail view showing the application of my improved method to the production of dies.

Referring to Fig. 1, I have shown portions of a tap hobbing machine including a spindle 10 rotatable in a bearing 11 and provided with a gear 12 and chuck or driver 13. A tap T is secured in the chuck 13 and the opposite end of the tap may be supported on a tail center 14.

A hob H is supported on a shaft or spindle 20, rotatable in bearings 21 and 22 on a support 23 longitudinally slidable in guideways in a stand 24. The spindle 20 and hob H may be rotated in any convenient manner, as by a flexible shaft 25.

The stand 24 may be adjusted toward and from the work by any suitable mechanism, whereby a cut of the desired depth will be taken.

An arm 26 projects outward from one end of the slide or support 23 and has a slot 28 to receive a stud 29 mounted in a lever 30. The lever 30 swings about a fixed pivot stud 31 and is provided with a cam roll 32 positioned in the peripheral cam groove 33 of a cam 34, mounted on a countershaft 35. The shaft 35 is provided with a gear 36 engaging the gear 12 previously described. These gears are preferably of the same size, so that the cam 34 makes one revolution for each rotation of the tap T.

The side walls of the cam groove 33 are disposed at a slight helical angle relative to the axis of the shaft 35, which angle corresponds to the pitch of the desired thread on the tap T.

In the process of manufacture, the hob H is rotated at a suitable cutting speed and the tap T is simultaneously rotated at relatively slow speed. Consequently the teeth of the hob H form a series of grooves in a selected land of the tap T and these grooves and the intervening teeth are formed at the desired pitch angle by reason of the gradual axial adjustment or shifting of the hob, effected by the helical cam groove 33 as the cam 34 rotates in unison with the rotation of the tap T.

The apparatus as thus far described may be used to produce ordinary taps not having my alternately offset teeth.

In order to produce this alternate offsetting of the teeth by the hobbing operation, I modify the cam groove 33 as indicated in Fig. 2.

The portion $a$ of the cam groove is used for producing the teeth on the land 1, which teeth are offset to the left with reference to the helix line P, providing clearance on the face $a'$.

When the teeth on the land 1 have been hobbed and the hob is out of contact with the tap, the cam groove is axially offset or shifted slightly to the right, as indicated at $b$, thereby causing the teeth on the land 2 to be offset to the right of the normal helix line P, with clearance as indicated at $b'$. The cam groove is then shifted back to produce a portion $c$ in helical alignment with the portion $a$ previously described and this portion produces the teeth of the land 3, with clearance on the right-hand side as indicated at $c'$.

The cam groove is then again offset or shifted to the right, as indicated at $d$, thereby producing the teeth of the land 4, with clearance on their left-hand faces as indicated at $d'$.

The cam groove 33 then drops abruptly back to its original position, after completion of the teeth on the land 4, and the parts are promptly returned to a relation where the cam roll 32 is again located in the initial cam portion $a$.

I am thus able to produce the alternately offset teeth shown in my prior application, with all of the advantages therein described, by the use of a thread hobbing machine for regular taps. Consequently the production of my specially offset taps requires no extra operations and involves no increased expense.

The carrying out of my improved method is not necessarily dependent on the use of the apparatus shown, as other mechanism may be used, or the relative axial movement of the hob or tap may be effected manually. Obviously, it is immaterial whether the hob or the tap is shifted, so long as relative axial movement occurs.

The method comprises first the provision of the blank for the tap T with the shank and the lands such as 1, 2, 3 and 4 and with the intervening flutes, all of these parts being symmetrically formed around the central axis. Then with the same hob each land in turn is cut with the grooves forming the desired teeth. Preferably the grooves of each land will be cut substantially simultaneously as shown and successive lands will be operated on in succession. The teeth will preferably have their apexes formed as flat ends $e$ extending along helical lines concentric around the central axis, and the center lines of these apexes of one row of teeth will be out of alignment with the center lines of the apexes of each adjacent row.

In Fig. 3, I have shown the relation of the parts for hobbing a die D by a hob H' projecting into the opening in the die. Relative axial shifting of the hob and die may be used to produce relatively offset teeth in the die D in the same manner as in the production of taps as previously described.

The invention may be applied to the production of three-land taps by hobbing one land in a normal helix line, relatively shifting the hob and tap axially in one direction to cause the teeth of the next land to be offset at one side of said normal helix line, and then relatively shifting the hob and tap to cause the teeth of the third land to be offset at the opposite side of the normal helix line. In this case, the axial shift between the second and third lands may be the normal amount of shift used in two or four flute, commonly about .003", while the shift between the first and second lands, or between the third and first, will be only one-half as much.

Having described my improved method or process and a form of apparatus by which the method may be carried out, I do not wish to be limited to the details herein disclosed, otherwise than as set forth in the claims, but what I claim is:—

1. The method of producing a thread cutting device comprising providing an integral structure having a number of lands and intervening flutes alternating around a given axis, cutting simultaneously a series of grooves in one of said lands to form a row of teeth having apexes disposed along predetermined helical center lines extending around said axis, and then cutting simultaneously by means having substantially identical cutting contours, a series of grooves in the next adjacent land helically off-set with respect to the grooves of the first-mentioned land to form a row of teeth having the same contours as the teeth of the preceding land and apexes disposed along predetermined helical center lines extending around said axis and helically out of alignment with the center lines of the apexes of the teeth of the preceding land.

2. The method of producing a thread cutting device comprising providing an integral structure having a number of lands and intervening flutes alternating around a given axis, cutting simultaneously a series of grooves in one of said lands to form a row of teeth having flat-ended apexes disposed along predetermined helical center lines extending around said axis, and then cutting simultaneously by means having substantially identical cutting contours a series of grooves in the next adjacent land helically offset with respect to the grooves of the first-mentioned land to form a row of teeth having the same contours as the teeth of the preceding land and flat-ended apexes disposed along predetermined helical center lines extending around said axis and helically out of alignment with the center lines of the apexes of the teeth of the preceding land.

3. The method of producing a thread cutting device comprising providing an integral structure having a number of lands and intervening flutes alternating around a given axis, cutting simultaneously a series of grooves in one of said lands to form a row of teeth having flat-ended apexes disposed along predetermined helical center lines extending around said axis, then cutting simultaneously by means having substantially identical cutting contours a series of grooves in the next adjacent land helically offset with respect to the grooves of the first-mentioned land to form a row of teeth having the same contours as the teeth of the preceding land and flat-ended apexes disposed along predetermined helical center lines extending around said axis and helically out of alignment with the center lines of the apexes of the teeth of the preceding land, and then cutting simultaneously by means having substantially identical cutting contours, a series of grooves in the next following land helically offset with respect to the grooves of the preceding land to form a row of teeth having the same contours as the teeth of the preceding land and flat-ended apexes disposed along predetermined center lines extending around said axis and helically out of alignment with the center lines of the apexes of the teeth of the preceding land.

4. The method of producing a thread cutting device comprising providing an integral structure having a number of lands and intervening flutes alternating around a given axis, cutting simultaneously a series of grooves in one of said lands to form a row of teeth having flat-ended apexes disposed along predetermined helical center lines extending around said axis, then cutting simultaneously by means having substantially identical cutting contours a series of grooves in the next adjacent land helically offset with respect to the grooves of the first-mentioned land to form a row of teeth having the same contours as the teeth of the preceding land and flat-ended apexes disposed along predetermined helical center lines extending around said axis and helically out of alignment with the center lines of the apexes of the teeth of the preceding land, and then cutting simultaneously by means having substantially identical cutting contours a series of grooves in the next following land helically offset with respect to the grooves of the preceding land to form a row of teeth having the same contours as the teeth of the preceding land and flat-ended apexes disposed along predetermined center lines extending around said axis and helically out of alignment with the center lines of the apexes of the teeth of the preceding land and in helical alignment with the center lines of the apexes of the teeth of the first-mentioned land.

FRANKLIN JUDGE.